United States Patent
Tadauchi et al.

(10) Patent No.: US 11,874,464 B2
(45) Date of Patent: Jan. 16, 2024

(54) HEAD-UP DISPLAY, HEAD-UP DISPLAY SYSTEM, MOVING OBJECT, AND METHOD OF DESIGNING HEAD-UP DISPLAY

(71) Applicant: KYOCERA Corporation, Kyoto (JP)

(72) Inventors: Ryo Tadauchi, Otsu (JP); Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/763,632

(22) PCT Filed: Sep. 10, 2020

(86) PCT No.: PCT/JP2020/034313
§ 371 (c)(1),
(2) Date: Mar. 24, 2022

(87) PCT Pub. No.: WO2021/059997
PCT Pub. Date: Apr. 1, 2021

(65) Prior Publication Data
US 2022/0334389 A1    Oct. 20, 2022

(30) Foreign Application Priority Data

Sep. 25, 2019  (JP) ................. 2019-174779

(51) Int. Cl.
*G02B 27/01* (2006.01)
*G02B 30/31* (2020.01)
(Continued)

(52) U.S. Cl.
CPC .......... *G02B 27/0101* (2013.01); *B60K 35/00* (2013.01); *G02B 30/30* (2020.01);
(Continued)

(58) Field of Classification Search
CPC .... B60K 35/00; G02B 27/01; G02B 27/0101; G02B 30/30; G02B 30/31; G02B 30/32;
(Continued)

(56) References Cited

U.S. PATENT DOCUMENTS

2013/0188021 A1* 7/2013 Sim .................. G06T 15/00
348/46

FOREIGN PATENT DOCUMENTS

EP     2 618 581 A2    7/2013
JP     2009-8722 A     1/2009
(Continued)

OTHER PUBLICATIONS

3D Consortium (3DC) Safety Guidelines Subcommittee, "3DC safety guidelines for the popularization of human-friendly 3D," Apr. 20, 2010, pp. 1-41.

*Primary Examiner* — Nitin Patel
*Assistant Examiner* — Cory A Almeida
(74) *Attorney, Agent, or Firm* — Studebaker & Brackett PC

(57) ABSTRACT

A head-up display includes a display panel, a parallax barrier, an optical system including a reflector and an optical member, and a controller. The optical system projects a virtual image of an image displayed by the display panel onto a virtual image plane. The controller controls the display panel such that first second images which have a parallax with each other are projected as a three-dimensional image in a field of view of the user, and a convergence angle at which the user views a point on the three-dimensional image is equal to or less than a maximum convergence angle which is greater by 0.43 degrees than a convergence angle for viewing a point on the virtual image plane and is equal to or greater than a minimum convergence angle which is less by 0.43 degrees than the convergence angle for viewing a point on the virtual image plane.

7 Claims, 9 Drawing Sheets

(51) Int. Cl.
    *B60K 35/00*     (2006.01)
    *G02B 30/30*     (2020.01)
    *G02B 30/32*     (2020.01)
    *H04N 13/371*     (2018.01)
    *H04N 13/383*     (2018.01)
    *H04N 13/344*     (2018.01)
    *H04N 13/315*     (2018.01)
    *H04N 13/363*     (2018.01)

(52) U.S. Cl.
    CPC ............. *G02B 30/31* (2020.01); *G02B 30/32* (2020.01); *H04N 13/344* (2018.05); *H04N 13/371* (2018.05); *H04N 13/383* (2018.05); *G02B 2027/0123* (2013.01); *G02B 2027/0141* (2013.01); *G02B 2027/0183* (2013.01); *H04N 13/315* (2018.05); *H04N 13/363* (2018.05)

(58) Field of Classification Search
    CPC .... G02B 2027/0123; G02B 2027/0141; G02B 2027/0183; H04N 13/315; H04N 13/344; H04N 13/363; H04N 13/371; H04N 13/383
    See application file for complete search history.

(56) References Cited

FOREIGN PATENT DOCUMENTS

| | | | | |
|---|---|---|---|---|
| KR | 20120059846 A | * | 12/2010 | ............. G02B 3/005 |
| KR | 10-2012-0059846 A | | 6/2012 | |

\* cited by examiner

FIG. 3

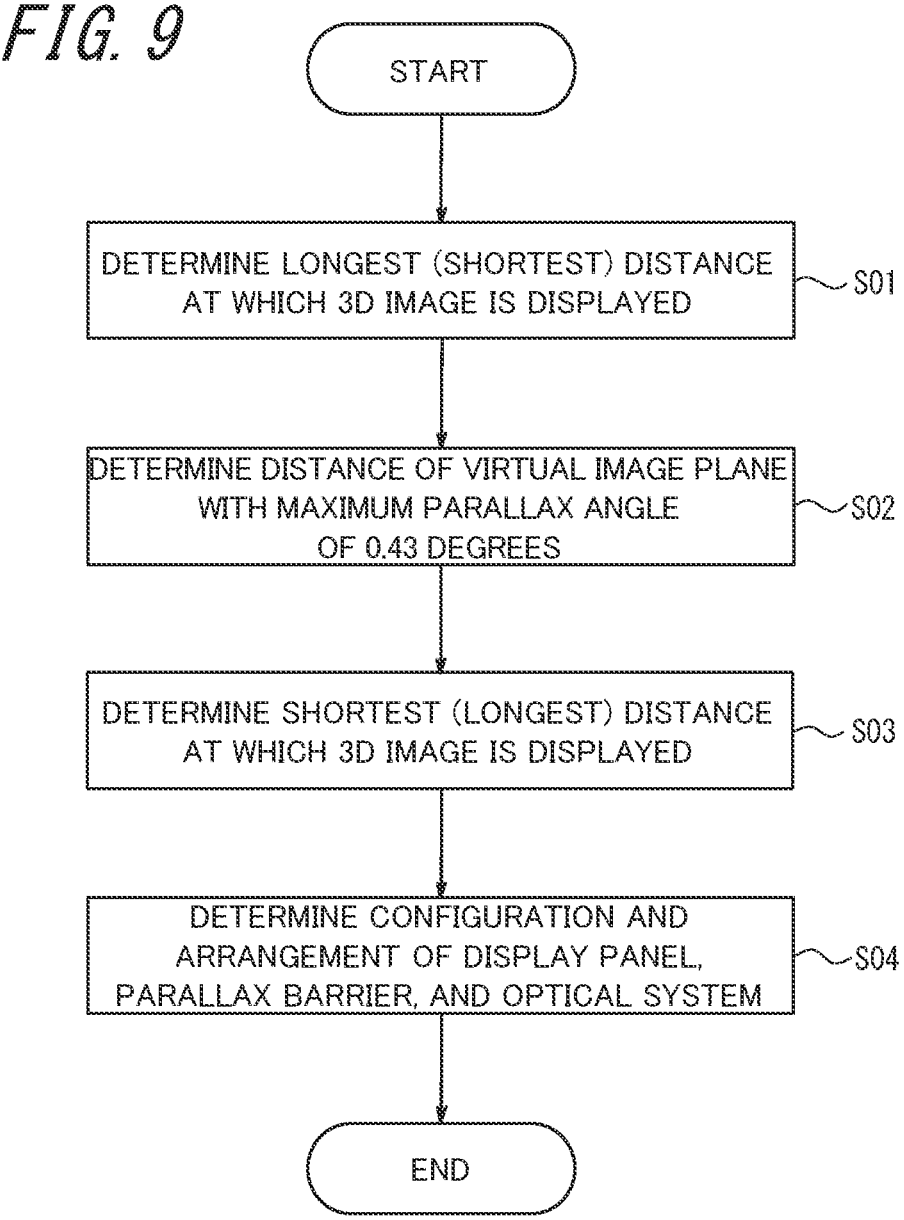

HEAD-UP DISPLAY, HEAD-UP DISPLAY SYSTEM, MOVING OBJECT, AND METHOD OF DESIGNING HEAD-UP DISPLAY

TECHNICAL FIELD

The present disclosure relates to a head-up display, a head-up display system, a moving object, and a method of designing a head-up display.

BACKGROUND ART

An example of technology of the related art is described in Patent Literature 1.

CITATION LIST

Patent Literature

Patent Literature 1: Japanese Unexamined Patent Publication JP-A 2009-008722

Non-Patent Literature

Non-Patent Literature 1: 3D Consortium Safety Guidelines Subcommittee, "3DC safety guidelines for the spread of human-friendly 3D," Apr. 20, 2010

SUMMARY OF INVENTION

The head-up display of the disclosure includes a display panel, an optical element, an optical system, and a processor. The display panel displays an image. The optical element defines a propagation direction of image light emitted from the display panel. The optical system is configured to propagate the image light having a propagation direction defined by the optical element, toward eyes of a user, and project a virtual image of the image onto a virtual image plane which is positioned at a distance of 3.5 m to 7.5 m from the eyes of the user. The processor is configured to cause the display panel to display the image, the image including a first image and a second image which have a parallax with each other. The optical element is configured to propagate the first image displayed on the display panel, toward a first eye of the user, and to propagate the second image displayed on the display panel, toward a second eye of the user. The processor controls the display panel such that the first image and the second image are projected as a three-dimensional image in a field of view of the user, and a convergence angle at which the user views a point on the three-dimensional image is equal to or less than a maximum convergence angle and is equal to or greater than a minimum convergence angle, the maximum convergence angle being greater by 0.43 degrees than a convergence angle for viewing a point on the virtual image plane, and the minimum convergence angle being less by 0.43 degrees than the convergence angle for viewing a point on the virtual image plane.

A head-up display system of the disclosure includes a detection device that detects positions of eyes of a user, and a head-up display. The head-up display includes a display panel, an optical element, an optical system, and a processor. The display panel displays an image. The optical element defines a propagation direction of image light emitted from the display panel. The optical system is configured to propagate the image light having a propagation direction defined by the optical element, toward the eyes of the user, and project a virtual image of the image onto a virtual image plane which is positioned at a distance of 3.5 m to 7.5 m from the eyes of the user. The processor is configured to cause the display panel to display the image, the image including a first image and a second image which have a parallax with each other. The optical element is configured to propagate the first image displayed on the display panel, toward a first eye of the user, and to propagate the second image displayed on the display panel, toward a second eye of the user. The processor controls the display panel such that the first image and the second image are projected as a three-dimensional image in a field of view of the user, and a convergence angle at which the user views a point on the three-dimensional image is equal to or less than a maximum convergence angle and is equal to or greater than a minimum convergence angle, the maximum convergence angle being greater by 0.43 degrees than a convergence angle for viewing a point on the virtual image plane, and the minimum convergence angle being less by 0.43 degrees than the convergence angle for viewing a point on the virtual image plane. The processor is configured to be able to change a region where the first image is displayed and a region where the second image is displayed on the display panel based on the positions of the eyes of the user.

A moving object of the disclosure includes a head-up display. The head-up display includes a display panel, an optical element, an optical system, and a processor. The display panel displays an image. The optical element defines a propagation direction of image light emitted from the display panel. The optical system is configured to propagate the image light having a propagation direction defined by the optical element, toward the eyes of the user, and project a virtual image of the image onto a virtual image plane which is positioned at a distance of 3.5 m to 7.5 m from the eyes of the user. The processor is configured to cause the display panel to display the image, the image including a first image and a second image which have a parallax with each other. The optical element is configured to propagate the first image displayed on the display panel, toward a first eye of the user, and to propagate the second image displayed on the display panel, toward a second eye of the user. The processor controls the display panel such that the first image and the second image are projected as a three-dimensional image in a field of view of the user, and a convergence angle at which the user views a point on the three-dimensional image is equal to or less than a maximum convergence angle and is equal to or greater than a minimum convergence angle, the maximum convergence angle being greater by 0.43 degrees than a convergence angle for viewing a point on the virtual image plane, and the minimum convergence angle being less by 0.43 degrees than the convergence angle for viewing a point on the virtual image plane.

A method of designing a head-up display of the disclosure includes determining a longest distance at which a three-dimensional image is viewed. The method includes determining a distance of a virtual image plane such that a convergence angle of a point on the virtual image plane onto which a virtual image of an image of a display panel is projected is greater by 0.43 degrees than a convergence angle of a point positioned at the longest distance. The method includes determining a shortest distance such that a convergence angle of a point positioned at the shortest distance at which the three-dimensional image is viewed is greater by 0.43 degrees than a convergence angle of a point on the virtual image plane. The method includes, based on the distance of the virtual image plane, determining a configuration and arrangement of the display panel, an optical element that defines a propagation direction of image light emitted from the display panel, and an optical system that propagates the image light having a propagation direction defined by the optical element, toward eyes of a user, and projects the virtual image of the image onto the virtual image plane.

A method of designing a head-up display of the disclosure includes determining a shortest distance at which a three-dimensional image is viewed. The method includes determining a distance of a virtual image plane such that a convergence angle of a point on the virtual image plane onto which a virtual image of an image of a display panel is projected is less by 0.43 degrees than a convergence angle of a point positioned at the shortest distance. The method includes determining a longest distance such that a convergence angle of a point positioned at the longest distance at which the three-dimensional image is viewed is less by 0.43 degrees than a convergence angle of a point on the virtual image plane. The method includes, based on the distance of the virtual image plane, determining a configuration and arrangement of the display panel, an optical element that defines a propagation direction of image light emitted from the display panel, and an optical system that propagates the image light having a propagation direction defined by the optical element, toward eyes of a user, and projects the virtual image of the image onto the virtual image plane.

BRIEF DESCRIPTION OF DRAWINGS

FIG. 3 is a view illustrating an example of a display panel illustrated in FIG. 2 viewed from a depth direction;

FIG. 9 is a flowchart illustrating an example of a method of designing a head-up display.

Figure 1:
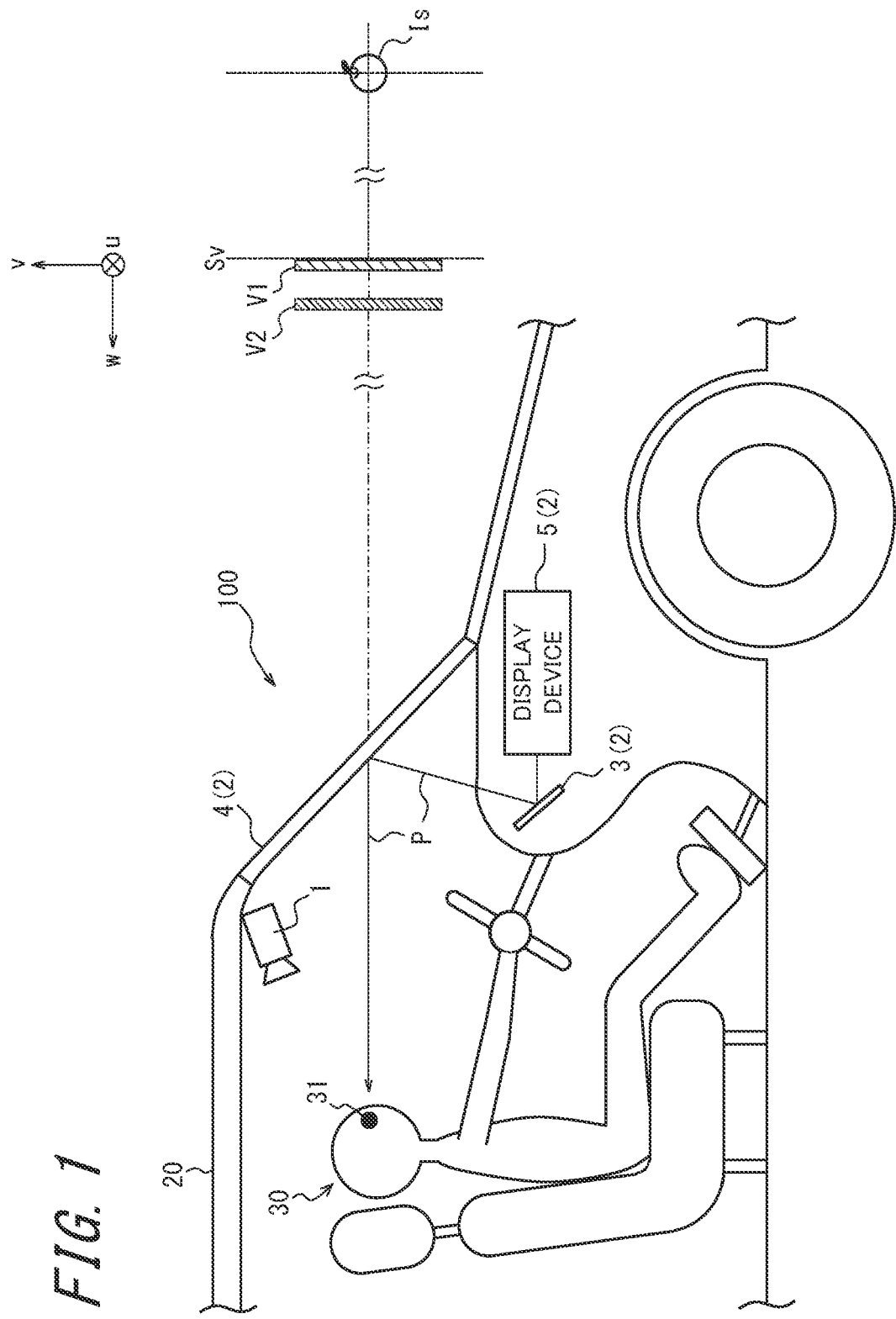
FIG. 1 is a view illustrating an example of a head-up display system mounted on a moving object.

Objects, features, and advantages of the disclosure will be more apparent from the following detailed description and drawings.

DESCRIPTION OF EMBODIMENTS

First, as a head-up display having a configuration underlying a head-up display of the disclosure, a head-up display that propagates images having a parallax with each other toward left and right eyes of a user, and projects a virtual image that is viewed as a three-dimensional image having depth in a field of view of the user, is known. It is also known that there is a comfortable parallax range for enjoying three-dimensional images comfortably in three-dimensional display devices that display three-dimensional images.

According to the head-up display having the configuration underlying the head-up display of the disclosure, it is described that it is easy to view the three-dimensional image when a difference between a convergence angle of the two eyes when viewing one point on a display on the three-dimensional display device and a convergence angle of the two eyes when viewing the three-dimensional image by a binocular parallax is equal to or less than 1 degree. However, the inventors of the present application confirmed that, in a case where the difference in convergence angle is between 0.5 to 1 degree in the head-up display that displays a three-dimensional image as a virtual image, discomfort such as 3D sickness occurs and a three-dimensional image cannot be viewed comfortably.

Therefore, an object of the present invention, which was made considering these points, is to provide a head-up display, a head-up display system, a moving object, and a method of designing a head-up display that enable a user to comfortably view a three-dimensional image.

Hereinafter, embodiments of the present invention will be described in detail with reference to the drawings. The drawings used in the following description are schematic. The dimensions, proportions, and the like in the drawings do not necessarily correspond to those in reality.

[Configuration of Head-Up Display System]

Figure 5:
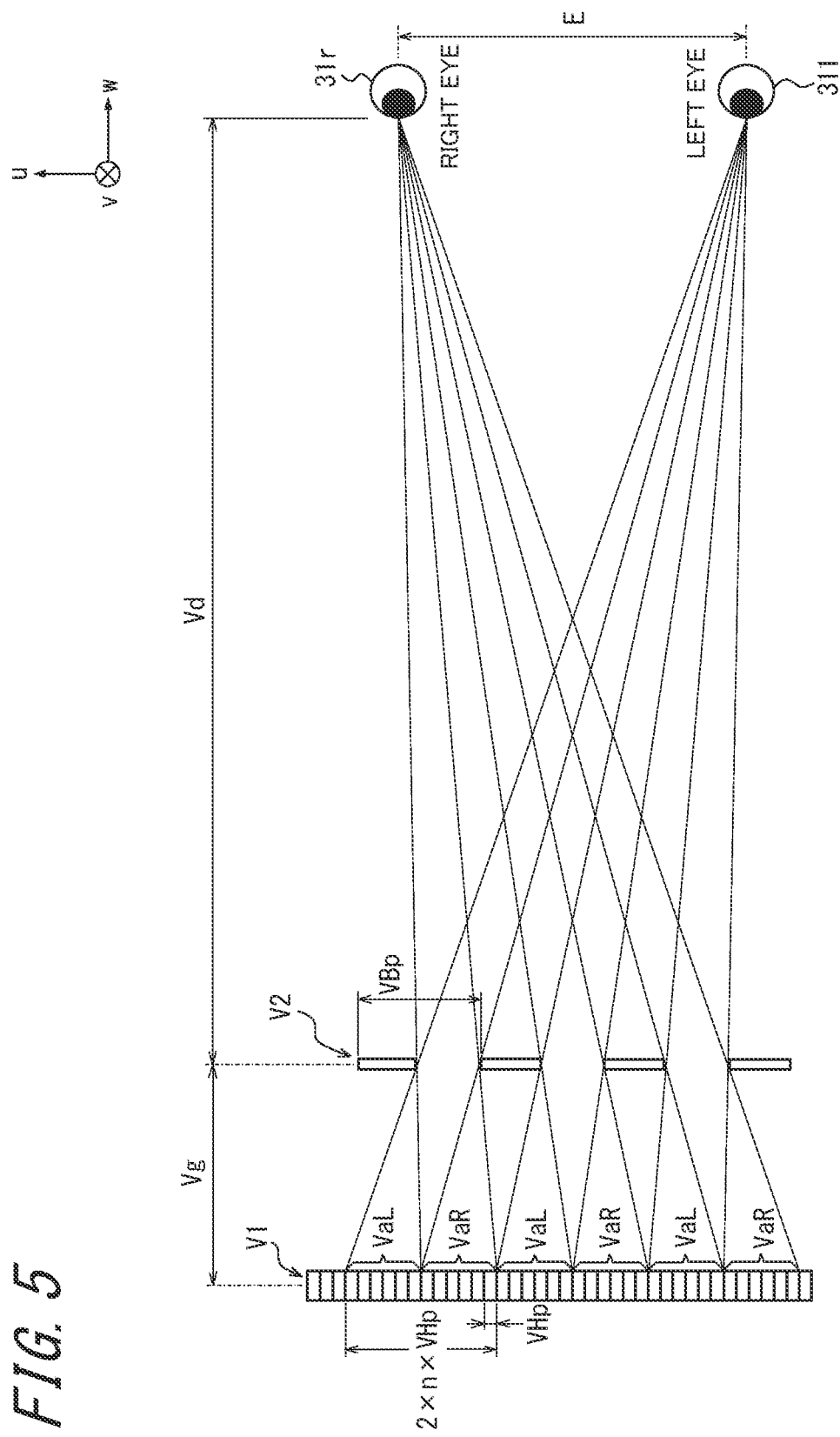
FIG. 5 is a view for describing a relationship between a virtual image illustrated in FIG. 1 and eyes of a user.

A head-up display system 100 according to one embodiment of the disclosure includes a detection device 1 and a head-up display (HUD) 2, as illustrated in FIG. 1. The head-up display system 100 may be mounted on a moving object 20. In FIG. 1 and FIG. 5 below, an inter-eye direction, which is a direction of a straight line passing through a left eye 31l and a right eye 31r of a user 30, is expressed as a u-axis direction. A front-rear direction of the user 30 is expressed as a w-axis direction. A height direction perpendicular to the u-axis direction and the w-axis direction is expressed as a v-axis direction.

The term "moving object" in the disclosure includes vehicles, ships, and aircraft. The term "vehicle" in the disclosure includes, but is not limited to, automobiles and industrial vehicles, and may include railroad vehicles, life vehicles, and fixed-wing aircraft traveling on runways. Automobiles may include any other vehicle that travels on the road, including, but not limited to, passenger cars, trucks, buses, motorcycles, and trolley buses. Industrial vehicles include industrial vehicles for agriculture and construction. Industrial vehicles include, but are not limited to, forklifts and golf carts. Industrial vehicles for agriculture include, but are not limited to, tractors, tillers, transplanters, binders, combines, and lawn mowers. Industrial vehicles for construction include, but are not limited to, bulldozers, scrapers, excavators, cranes, dump trucks, and road rollers. Vehicles include those that are driven by human power. The classification of vehicles is not limited to the above. For example, automobiles may include an industrial vehicle capable of traveling on a road, and the same vehicle may be included in a plurality of classifications. Vessels in the disclosure include marine jets, boats, and tankers. Aircraft in the disclosure include fixed wing aircraft and rotary wing aircraft.

(Detection Device)

The head-up display system 100 is configured to detect positions of eyes 31 of the user 30 who observes the three-dimensional image using the detection device 1. The eyes 31 of the user 30 include the left eye 31l (first eye) and the right eye 31r (second eye) of the user 30. In this application, in a case where the left eye 31l and the right eye 31r of the user 30 are not specifically distinguished, the left eye 31l and the right eye 31r are collectively described as the eye 31. The detection device 1 outputs the detected position of the eye 31 of the user 30 to the HUD 2. In a case where the head-up display system 100 is mounted on the moving object 20, the user 30 may be a driver of the moving object 20. The detection device 1 may include an imaging device or a sensor.

In a case where the head-up display system 100 is mounted on the moving object 20, the detection device 1 may be attached to a rear-view mirror. The detection device 1 may be attached to a cluster, for example, in an instrument panel. The detection device 1 may be attached to a center panel. The detection device 1 may be attached to a support unit of a steering wheel disposed at the center of the steering wheel. The detection device 1 may be attached to a dashboard.

In a case where the detection device 1 includes an imaging device (camera), the imaging device is configured to acquire an image of a subject and generate an image of the subject. The imaging device includes an imaging element. The imaging element may include, for example, a charge coupled device (CCD) imaging element or a complementary metal oxide semiconductor (CMOS) imaging element. The imaging device is disposed such that the face of the user 30 is positioned on the subject side. The detection device 1 is configured to detect the position of at least one of the left eye 31*l* and the right eye 31*r* of the user 30. For example, the detection device 1 may be configured to use a predetermined position as the origin and detect the displacement direction and the displacement amount of the position of the eye 31 from the origin. The detection device 1 may be configured to detect the position of at least one of the left eye 31*l* and the right eye 31*r* from the captured image of the imaging device. The detection device 1 may be configured to detect the position of at least one of the left eye 31*l* and the right eye 31*r* as coordinates of the three-dimensional space using two or more imaging devices.

The detection device 1 may not include a camera and may be connected to a camera outside the device. The detection device 1 may include an input terminal configured to input signals from the camera outside the device. The camera outside the device may be directly connected to the input terminal. The camera outside the device may be indirectly connected to the input terminal via a shared network. The detection device 1 without a camera may include the input terminal configured such that the camera inputs video signals. The detection device 1 without a camera may be configured to detect the position of at least one of the left eye 31*l* and the right eye 31*r* from the video signal input to the input terminal.

In a case where the detection device 1 includes a sensor, the sensor may be an ultrasonic sensor or an optical sensor. The detection device 1 may be configured to detect the position of the head of the user 30 using the sensor and to detect the position of at least one of the left eye 31*l* and the right eye 31*r* based on the position of the head. The detection device 1 may be configured to detect the position of at least one of the left eye 31*l* and the right eye 31*r* as coordinates of the three-dimensional space using one or two or more sensors.

The detection device 1 may be configured to detect the moving distance of the left eye 31*l* and the right eye 31*r* along the eyeball alignment direction based on the detection result of the position of at least one of the left eye 31*l* and the right eye 31*r*.

The detection device 1 is configured to output positional information indicating the position of the eye 31 of the user 30 to a display device 5. The detection device 1 may be configured to output the positional information to the display device 5 of the HUD 2 via wired, wireless, and communication networks such as controller area network (CAN).

(Head-Up Display)

The HUD 2 according to one embodiment includes a reflector 3, an optical member 4, and a display device 5. The reflector 3 and the optical member 4 constitute an optical system. The optical system of the HUD 2 may include optical elements such as lenses and mirrors in addition to the reflector 3 and the optical member 4. In other embodiments, the optical system of the HUD 2 can also be configured with lenses only, without using the reflector 3.

The reflector 3 is configured to reflect the image light emitted from the display device 5 toward a predetermined region of the optical member 4. The predetermined region is a region where image light reflected from the predetermined region is directed toward the eye 31 of the user 30. The predetermined region can be determined by the direction of the eye 31 of the user 30 with respect to the optical member 4 and the incident direction of the image light onto the optical member 4. The reflector 3 may be a concave mirror. The optical system including the reflector 3 may have a positive refractive index.

The optical member 4 is configured to reflect the image light emitted from the display device 5 and reflected by the reflector 3 toward the left eye 31*l* and the right eye 31*r* of the user 30. For example, the windshield of the moving object 20 may also be used as the optical member 4. As the optical member 4, a plate-like member for the head-up display called combiner may be positioned inside the windshield. The HUD 2 causes the light emitted from the display device 5 to travel along an optical path P to the left eye 31*l* and the right eye 31*r* of the user 30. The user 30 can view the light that has reached along the optical path P as a virtual image.

The arrangement and configuration of the optical system of the HUD 2, including the reflector 3 and the optical member 4, determines the position of the virtual image plane onto which the image light emitted from the display device 5 projects the virtual image. As an example, in the present embodiment, the virtual image plane can be positioned at a distance of 3.5 m to 7.5 m from the eye 31 of the user 30.

(Display Device)

Figure 2:
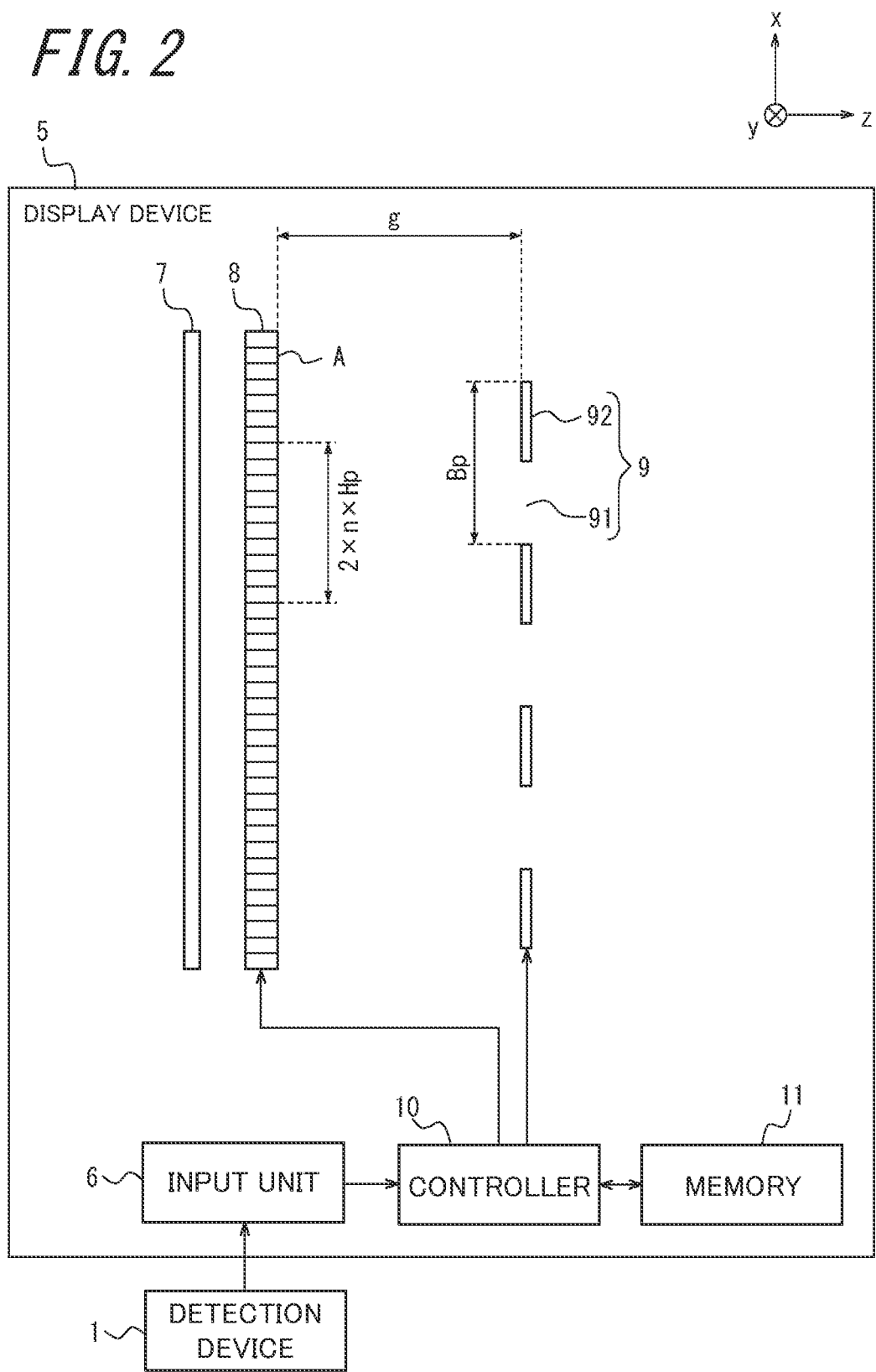
FIG. 2 is a view illustrating a schematic configuration of a head-up display illustrated in FIG. 1.

As illustrated in FIG. 2, the display device 5 can include an input unit 6, an irradiator 7, a display panel 8, a parallax barrier 9 as an optical element, a controller 10, and a memory 11.

The input unit 6 is configured to receive information indicating the position of the eye 31 of the user 30 as detected by the detection device 1. The input unit 6 has a communication function that follows the communication method with the detection device 1. The input unit 6 includes a wired and/or wireless communication interface. The input unit 6 can include connectors such as electrical connectors and optical connectors, which support wired communication. The input unit 6 can include antennas that support wireless communication.

The irradiator 7 can be configured to planarly irradiate the display panel 8. The irradiator 7 may include a light source, a light guide plate, a diffusion plate, a diffusion sheet, and the like. The irradiator 7 is configured to emit irradiated light from the light source and to uniformize the irradiated light in the surface direction of the display panel 8 using a light guide plate, a diffusion plate, a diffusion sheet, and the like. The irradiator 7 can be configured to emit the uniformized light toward the display panel 8.

As the display panel 8, a display panel such as a transmissive liquid crystal display panel can be employed. The display panel 8 is not limited to a transmissive liquid crystal panel, but other display panels such as organic EL can be used. In a case where a self-luminous type display panel is used as the display panel 8, the display device 5 may not include the irradiator 7.

Figure 3:
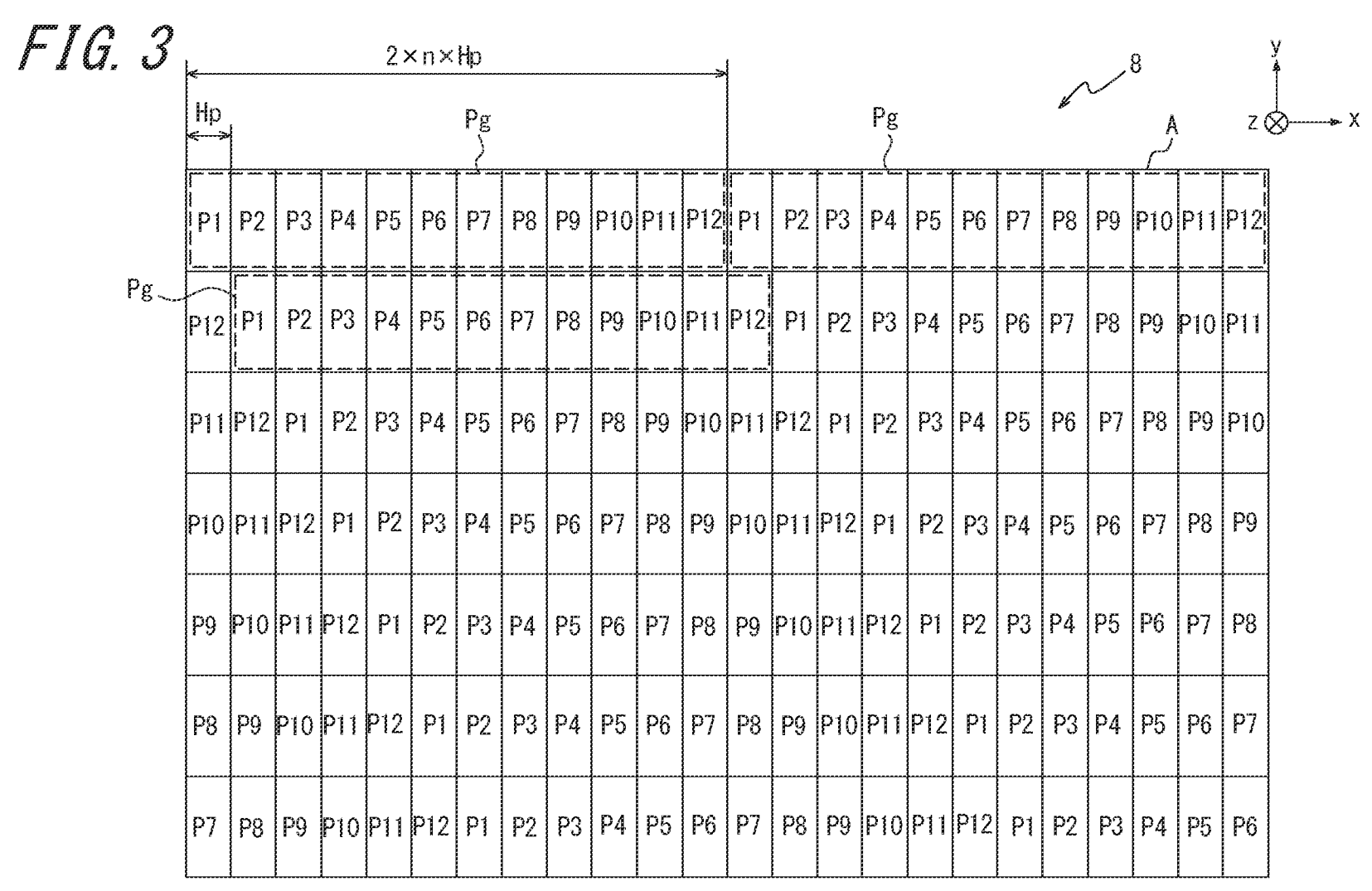
Figure 4:
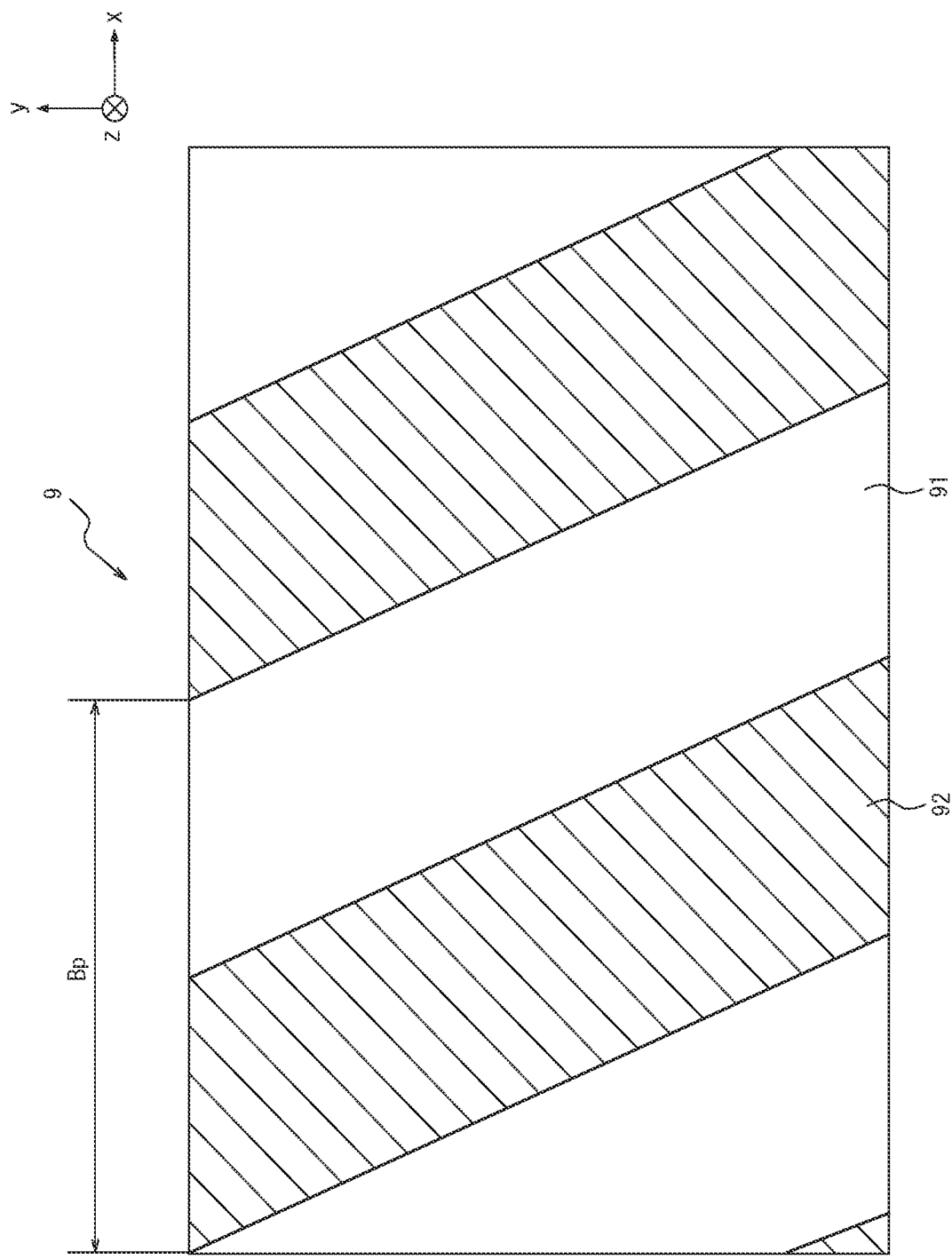
FIG. 4 is a view illustrating an example of a parallax barrier illustrated in FIG. 2 viewed from the depth direction.

As illustrated in FIG. 3, the display panel 8 includes a plurality of division regions on an active area A formed in a planar shape. The active area A is configured to display a parallax image. The parallax image includes a left-eye image, which will be described later, and a right-eye image, which has a parallax with respect to the left-eye image. One of the left-eye image and the right-eye image is a first image, and the other one is a second image. Each of the plurality of division regions is a region divided in a first direction and a second direction orthogonal to the first direction. The direction orthogonal to the first direction and the second direction is referred to as a third direction. The first direction may be referred to as a horizontal direction. The second direction may be referred to as a vertical direction. The third direction may be referred to as a depth direction. The first direction, the second direction, and the third direction are not limited to these, respectively. In FIGS. 2 to 4, the first direction is expressed as an x-axis direction. The second direction is expressed as a y-axis direction. The third direction is expressed as a z-axis direction.

One subpixel corresponds to each of the plurality of division regions. The active area A includes a plurality of subpixels arranged in a grid pattern along the horizontal and vertical directions.

Each subpixel corresponds to any of colors R (Red), G (Green), and B (Blue), and a set of three subpixels (R, G, and B) can configure one pixel. One pixel can be referred to as one pixel. The horizontal direction is, for example, a direction in which the plurality of subpixels that configure one pixel are aligned. The vertical direction is, for example, a direction in which the plurality of subpixels of the same color are aligned.

The plurality of subpixels arranged in the active area A configure a plurality of subpixel groups Pg under the control of the controller 10. A plurality of subpixel groups Pg are repeatedly arranged in the horizontal direction. The plurality of subpixel groups Pg can be arranged at the same position in the vertical direction and can be arranged being shifted. For example, the plurality of subpixel groups Pg can be arranged adjacent to each other and repeated in the vertical direction, at a position shifted by one subpixel in the horizontal direction. The plurality of subpixel groups Pg include a plurality of subpixels in a predetermined row and column. Specifically, the plurality of subpixel groups Pg include (2×n×b) subpixels P1 to PN (N=2×n×b), which are arranged consecutively, that is, b in the vertical direction (b rows) and 2×n in the horizontal direction (2×n columns). In the example illustrated in FIG. 3, n=6 and b=1. In the active area A, a plurality of subpixel groups Pg including twelve subpixels P1 to P12, which are arranged consecutively, that is, one in the vertical direction and twelve in the horizontal direction. In the example illustrated in FIG. 3, some subpixel groups Pg are marked with a sign.

The plurality of subpixel groups Pg are the smallest unit for the controller 10 to perform control for displaying an image. Each subpixel included in the plurality of subpixel groups Pg is identified by the identification information P1 to PN (N=2×n×b). The plurality of subpixels P1 to PN (N=2×n×b) with the same identification information of all subpixel groups Pg are configured to be controlled simultaneously by the controller 10. For example, in a case of switching the image to be displayed on the subpixel P1 from the left-eye image to the right-eye image, the controller 10 can simultaneously switch the image to be displayed on the plurality of subpixels P1 in all subpixel groups Pg from the left-eye image to the right-eye image.

The parallax barrier 9 is formed by a flat surface along the active area A, and is separated by a predetermined distance (gap) g from the active area A, as illustrated in FIG. 2. The parallax barrier 9 may be positioned on the opposite side of the irradiator 7 with respect to the display panel 8. The parallax barrier 9 may be positioned on the irradiator 7 side of the display panel 8.

As illustrated in FIG. 4, the parallax barrier 9 defines the propagation direction of the image light emitted from the plurality of subpixels for each light-transmitting region 91, which is a plurality of strip regions extending in a predetermined direction within the surface. Specifically, the parallax barrier 9 includes a plurality of dimming regions 92 where the image light is diminished. The plurality of dimming regions 92 define the light-transmitting region 91 between the two dimming regions 92 that are adjacent to each other. The plurality of light-transmitting regions 91 have a higher light transmittance than that of the plurality of dimming regions 92. The light transmittance of the plurality of light-transmitting regions 91 can be 10 times or more, preferably 100 times or more, and more preferably 1000 times or more the light transmittance of the plurality of dimming regions 92. The plurality of dimming regions 92 have a lower light transmittance than that of the plurality of light-transmitting regions 91. The plurality of dimming regions 92 may block the image light.

The plurality of light-transmitting regions 91 and the plurality of dimming regions 92 extend in a predetermined direction along the active area A and are repeatedly alternately arranged in the direction orthogonal to the predetermined direction. The predetermined direction is, for example, a direction along the diagonal of one subpixel when the display panel 8 and the parallax barrier 9 are viewed from the depth direction (z-axis direction). The predetermined direction can be, for example, a direction that crosses t subpixels in the y-axis direction while crossing s subpixels in the x-axis direction (where both s and t are prime positive integers) when the display panel 8 and the parallax barrier 9 are viewed in the depth direction (z-axis direction). The predetermined direction may be the y-axis direction. The predetermined direction is a direction corresponding to a direction in which the plurality of subpixel groups Pg are arranged. For example, in the example of FIG. 3, the plurality of subpixel groups Pg are shifted by one row in the second direction and by one column in the first direction, and thus, s=1 and t=1.

The parallax barrier 9 may be made of a film or a plate-like member. In this case, the plurality of dimming regions 92 is made of a film or a plate-like member. The plurality of light-transmitting regions 91 may be an opening portion provided in a film or a plate-like member. The film may be made of resin or other materials. The plate-like member may be made of resin or metal, or other materials. The parallax barrier 9 is not limited to a film or a plate-like member, but may be made of other types of members. The parallax barrier 9 may be made of a light-shielding base material. The parallax barrier 9 may be made of a base material containing additives that have light-blocking properties.

The parallax barrier 9 can also be configured by a liquid crystal shutter. The liquid crystal shutter can control the light transmittance depending on the applied voltage. The liquid crystal shutter is configured by a plurality of pixels, and may control the light transmittance in each pixel. The plurality of light-transmitting regions 21 and the plurality of dimming regions 92 by the liquid crystal shutter are regions that correspond to the arrangement of the plurality of pixels of the liquid crystal shutter. In a case where the parallax barrier 9 is configured by the liquid crystal shutter, the boundary between the plurality of light-transmitting regions 91 and the plurality of dimming regions 92 can be in a stepped shape corresponding to the shape of the plurality of pixels.

A part of the image light emitted from the active area A of the display panel 8 passes through the plurality of light-transmitting regions 91 and reaches the optical member 4 through the reflector 3. Furthermore, the image light that has reached the optical member 4 is reflected by the optical member 4 and reaches the eyes 31 of the user 30. Accordingly, the eyes 31 of the user 30 can recognize a first virtual image V1, which is a virtual image of the image displayed in the active area A in front of the optical member 4. The surface onto which the first virtual image V1 is projected is called a virtual image plane Sv. In this application, forward is a direction of the optical member 32 as viewed from the user 30. Forward is a direction in which the moving object 20 normally moves. As illustrated in FIG. 5, the user 30 apparently recognizes the image as if a second virtual image V2, which is a virtual image of the parallax barrier 9, defines the direction of the image light from the first virtual image V1.

In this manner, the user 30 apparently recognizes the image as if the first virtual image V1 is viewed through the second virtual image V2. The second virtual image V2, which is actually a virtual image of the parallax barrier 9, is not viewed. However, in the following, the second virtual image V2 will be described as being at the position where the virtual image of the parallax barrier 9 is apparently formed and is considered to define the image light from the first virtual image V1. In the following, the region within the first virtual image V1 that can be viewed by the user 30 due to the image light propagating to the position of the eyes 31 of the user 30 is called a visible region Va. The region within the first virtual image V1 that can be viewed by the user 30 due to the image light propagating to the position of the left eye 31l of the user 30 is called a left visible region VaL (first visible region). The region within the first virtual image V1 that can be viewed by the user 30 due to the image light propagating to the position of the right eye 31r of the user 30 is called a right visible region VaR (second visible region).

A virtual image barrier pitch VBp and a virtual image gap Vg are defined such that the following expressions (1) and (2) using an optimal viewing distance Vd are established.

$$E:Vd=(n \times VHp):Vg \quad \text{Expression (1)}$$

$$Vd:VBp=(Vdv+Vg):(2 \times n \times VHp) \quad \text{Expression (2)}$$

The virtual image barrier pitch VBp is an arrangement interval in the direction corresponding to the u-axis direction of the plurality of dimming regions 92 projected as the second virtual image V2. The virtual image gap Vg is a distance between the second virtual image V2 and the first virtual image V1. The optimal viewing distance Vd is a distance between the position of each of the left eye 31l and the right eye 31r of the user 30, respectively, as indicated by the positional information acquired from the detection device 1, and the virtual image V2 of the parallax barrier 9. An inter-eye distance E is a distance between the left eye 31l and the right eye 31r. The inter-eye distance E, for example, may be 61.1 mm to 64.4 mm, that is, a value calculated by the study conducted by the National Institute of Advanced Industrial Science and Technology. VHp is a length in the horizontal direction of the virtual image of the plurality of subpixels. VHp is a length of the virtual image of the plurality of subpixels in the first virtual image V1 in a direction corresponding to the first direction.

The left visible region (first visible region) VaL illustrated in FIG. 5 is a region of the virtual image plane Sv that is viewed by the left eye 31l of the user 30 when the image light transmitted through the plurality of light-transmitting regions 91 of the parallax barrier 9 reaches the left eye 31l of the user 30, as described above. The right visible region (second visible region) VaR is a region of the virtual image plane Sv that is viewed by the right eye 31r of the user 30 when the image light transmitted through the plurality of light-transmitting regions 91 of the parallax barrier 9 reaches the right eye 31r of the user 30, as described above.

Figure 6:
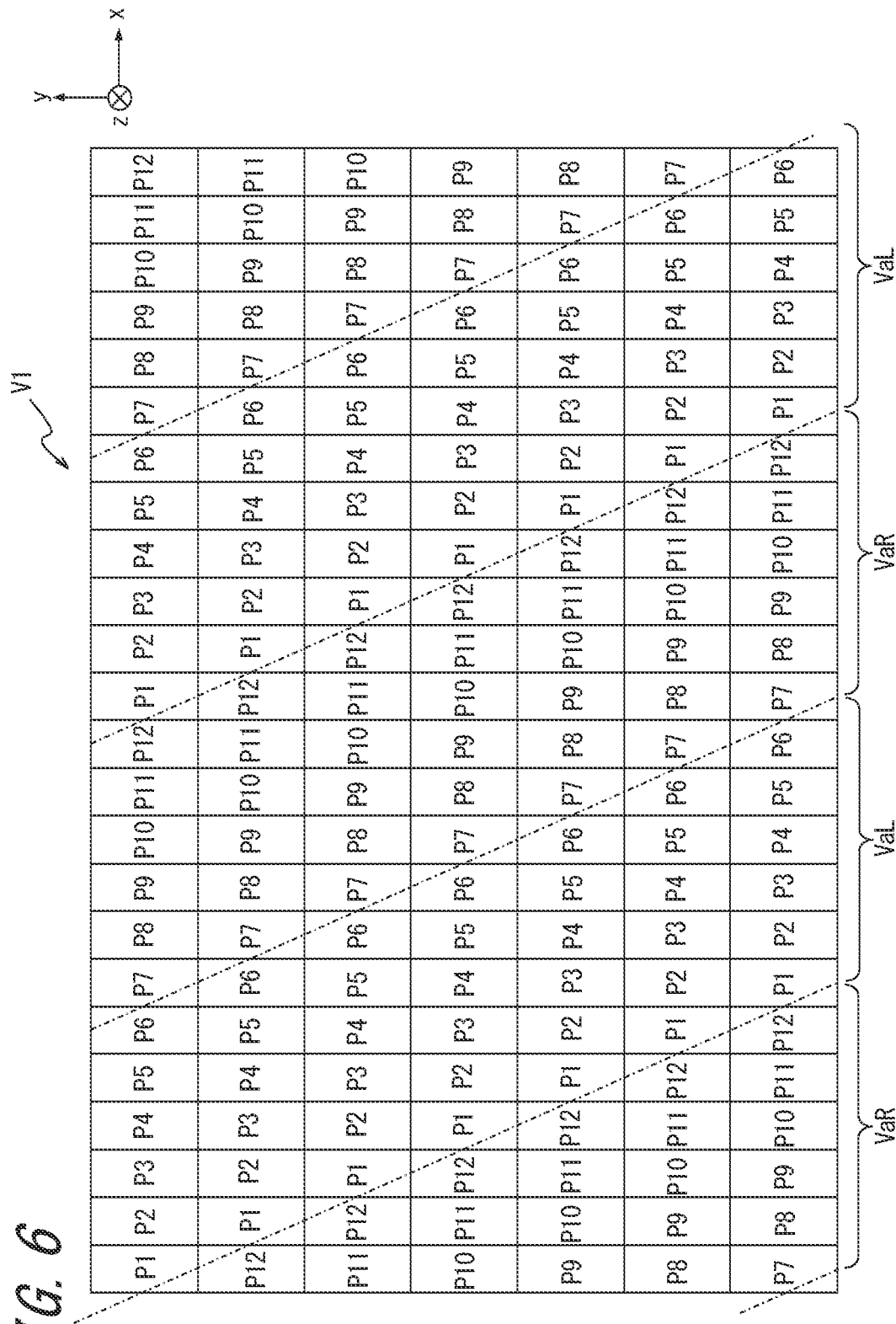
FIG. 6 is a view for describing a display example of subpixels in the virtual image of the display panel.

As an example, the arrangement of the plurality of subpixels of the first virtual image V1 when viewed from the left eye 31l and the right eye 31r of the user 30 is illustrated in FIG. 6 in a case where an aperture ratio of the parallax barrier 9 is 50%. When the aperture ratio is 50%, the plurality of light-transmitting regions 91 and the plurality of dimming regions 92 of the parallax barrier 9 have equal inter-eye direction (x-axis direction) widths. In FIG. 6, the one-dot chain line illustrates the virtual image of the boundary between the plurality of light-transmitting regions 91 and the plurality of dimming regions 92 of the parallax barrier 9. The left visible region VaL which is visible from the left eye 31l and the right visible region VaR which is visible from the right eye 31r are regions positioned between the two-dot chain lines, respectively, and extending diagonally in the x direction and the y direction. The right visible region VaR is not visible from the left eye 31l. The left visible region VaL is not visible from the right eye 31r.

In the example of FIG. 6, the left visible region VaL includes all virtual images of the plurality of subpixels P2 to P5 and most of the virtual images of the plurality of subpixels P1 and P6 which are arranged in the active area A. It is difficult for the left eye 31l of the user 30 to view the virtual images of the plurality of subpixels P7 to P12 arranged in the active area A. The right visible region VaR includes all virtual images of the plurality of subpixels P8 to P11 and most of the virtual images of the plurality of subpixels P7 and P12 which are arranged in the active area A. It is difficult for the right eye 31r of the user 30 to view the virtual images of the plurality of subpixels P1 to P6 arranged in the active area A. The controller 10 can display the left-eye image in the plurality of subpixels P1 to P6. The controller 10 can display the right-eye image in the plurality of subpixels P7 to P12. By doing so, the left eye 31l of the user 30 mainly view the virtual image of the left-eye image of the left visible region VaL, and the right eye 31r mainly view the virtual image of the right-eye image of the right visible region VaR. As described above, the right-eye image and the left-eye image are parallax images that have a parallax with each other. Therefore, the user 30 views the right-eye image and the left-eye image as a three-dimensional image.

The controller 10 is connected to each configuration element of the head-up display system 100 and can be configured to control each configuration element. The configuration element controlled by the controller 10 includes the detection device 1 and the display panel 8. The controller 10 is configured as a processor, for example. The controller 10 may include one or more processors. The one or more processors may include general-purpose processors that are configured to load specific programs and perform specific functions, as well as dedicated processors that are specialized for specific processing. A dedicated processor may include an application specific integrated circuit (ASIC). The one or more processors may include a programmable logic device (PLD). The PLD may include an FPGA (Field-Programmable Gate Array). The controller 10 may be either an SoC (System-on-a-Chip) or an SiP (System In a Package) with one or a plurality of processors working together. The controller 10 may include a storage unit, and stores various information or programs for operating each configuration element of the head-up display system 100 in the storage unit. The storage unit may be configured with semiconductor memory, for example. The storage unit may be configured to function as the work memory of the controller 10.

The controller 10 is configured to cause the display panel 8 to display the right-eye image and the left-eye image, which have a parallax with each other. The controller 10 is configured to change the region where the left-eye image is displayed on the display panel 8 and the region where the right-eye image is displayed, based on the position of the eye 31 of the user 30. The controller 10 is configured to control the image displayed by each subpixel of the display panel 8 by switching between the right-eye image and the left-eye image.

As described above, the controller 10 can display the left-eye image on the plurality of subpixels P1 to P6 when the left visible region VaL of the first virtual image V1 viewed from the eye 31 of the user 30 is at the position illustrated in FIG. 6. The controller 10 can display the right-eye image on the plurality of subpixels P7 to P12 when the right visible region VaR of the first virtual image V1 viewed from the eye 31 of the user 30 is at the position illustrated in FIG. 6. In other embodiments, the controller 10 can cause the plurality of subpixels F2 to P5 to display the left-eye image, the plurality of subpixels P8 to P11 to display the right-eye image, and the other plurality of subpixels P1, P6, P7, and P12 to display black with a luminance value of 0. In this case, the occurrence of crosstalk can be particularly reduced.

As the position of the eye 31 of the user 30 changes, the range of the plurality of subpixels P1 to P12 from which the virtual image can be viewed by the left eye 31l and the right eye 31r of the user 30 changes. The controller 10 is configured to determine the plurality of subpixels to display the left-eye image and the plurality of subpixels to display the right-eye image from the plurality of subpixels P1 to P12 of each of the subpixel groups Pg according to the position of the eye 31 of the user 30 acquired by the input unit 6. The controller 10 is configured to display the left-eye image on the plurality of subpixels that have been determined to display the left-eye image. The controller 10 is configured to display the right-eye image on the plurality of subpixels that have been determined to display the right-eye image.

Figure 7:
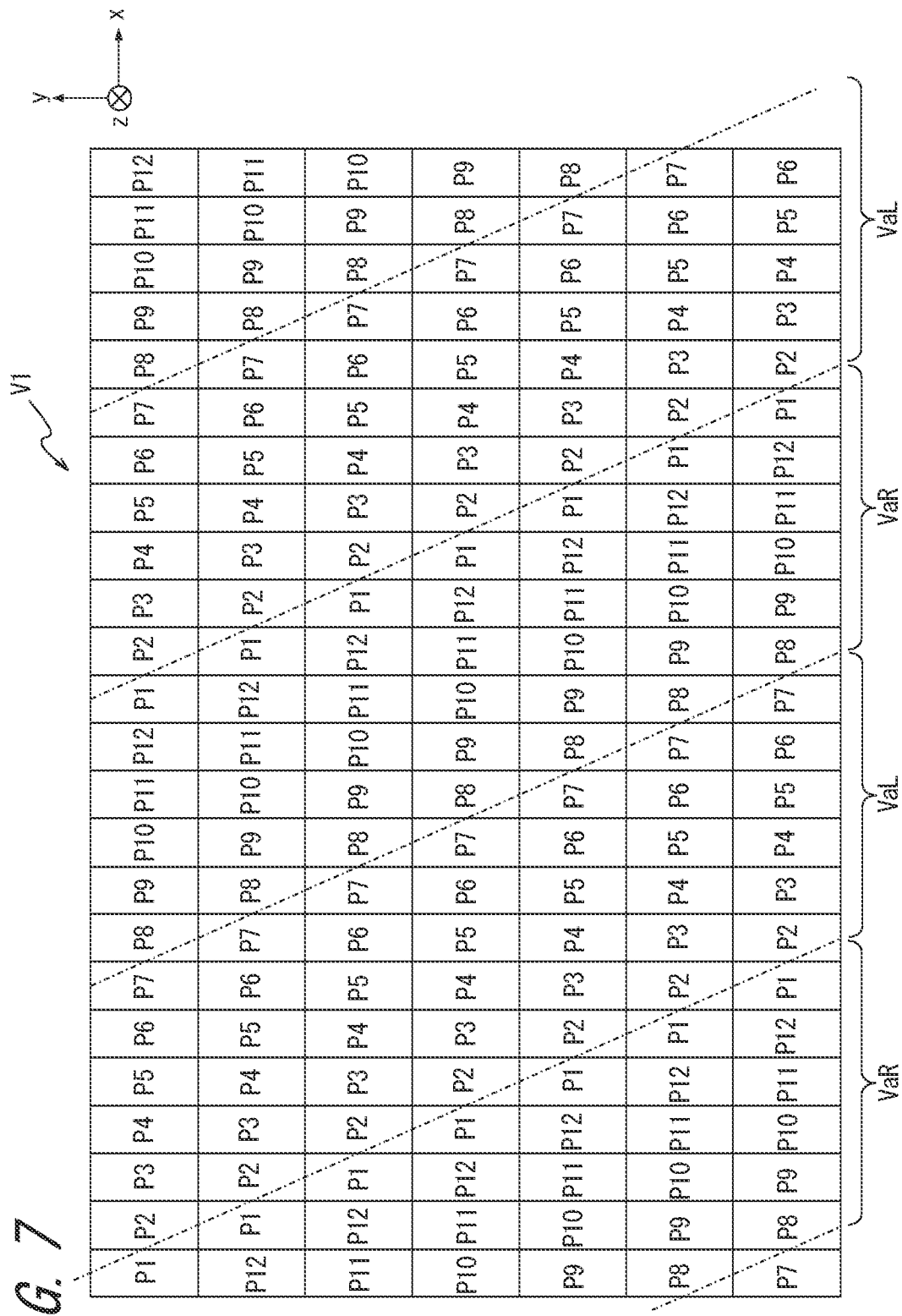
FIG. 7 is a view for describing a display example of subpixels in the virtual image of the display panel.

For example, in a case where the eyes of the user 30 move relatively to the left in a state of observing the first virtual image V1 as illustrated in FIG. 6, the second virtual image V2, which is the virtual image of the parallax barrier 9, moves to the right. For example, in a case where the virtual image of the boundary between the plurality of light-transmitting regions 91 and the plurality of dimming regions 92 of the parallax barrier 9 viewed from the user 30 moves to the right as illustrated in FIG. 7, the left visible region VaL and the right visible region VaR also move to the right. In a case of FIG. 7, all of the plurality of subpixels P3 to P6 and most of the subpixels P2 and P7 are included in the left visible region VaL. All of the plurality of subpixels P9 to P12 and most of the plurality of subpixels P8 and P1 are included in the right visible region VaR. Therefore, the controller 10 can display the left-eye image in the plurality of subpixels P2 to P7 of the display panel 8. The controller 10 can display the right-eye image in the plurality of subpixels P1 and P8 to P12 of the display panel 8.

The controller 10 is configured to control the display panel 8 such that the left-eye image and the right-eye image are projected as a three-dimensional image in the field of view of the user 30. The controller 10 causes the display panel 8 to display the images of the stereoscopic objects, which are display targets included in the left-eye image and the right-eye image, to have a desired parallax. The parallax between the left-eye image and the right-eye image corresponds to the convergence angle of the plurality of stereoscopic object images Is displayed on the HUD 2. The controller 10 may cause the display panel 8 to display the image having a parallax stored in the memory 11 in advance. The controller 10 may calculate the parallax in accordance with the distance of the stereoscopic object to be displayed in the three-dimensional image in real time and generate the left-eye image and the right-eye image to be displayed on the display panel 8.

The memory 11 is configured by any storage device, such as random access memory (RAM) and read only memory (ROM). The memory 11 is configured to store information received by the input unit 6, information converted by the controller 10, and the like. For example, the memory 11 is configured to store the information on the position of the eye 31 of the user 30 acquired by the input unit 6.

[Display Position of Stereoscopic Object]

In the HUD 2, the first image and the second image which are displayed in the active area A are projected onto the virtual image plane Sv. Since the first image and the second image projected onto the virtual image plane Sv have a parallax with each other, the images are projected as a three-dimensional image with a spread in the depth direction corresponding to the parallax in the field of view of the user 30. Using FIG. 8, the positions of the plurality of stereoscopic object images Is which are viewed by the user 30 in the HUD 2 of the disclosure are described. The plurality of stereoscopic object images Is are images of stereoscopic objects included in the three-dimensional image. The three-dimensional image may include the plurality of stereoscopic object images Is with different distances to be viewed by the user 30.

Figure 8:
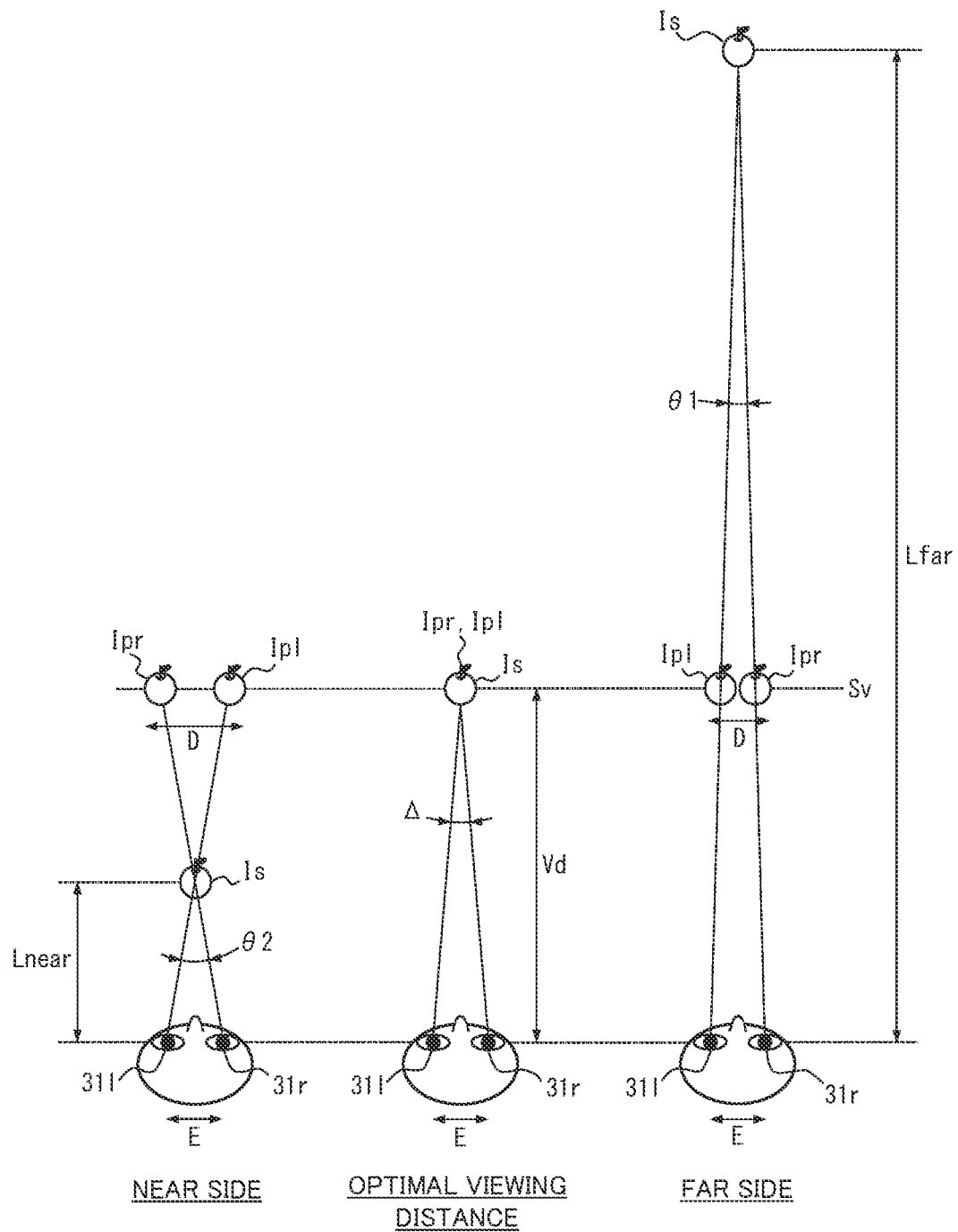
FIG. 8 is a view for describing a relationship between a display position of a stereoscopic image and a convergence angle.

FIG. 8 illustrates the display positions of a left-eye object image Ipl and a right-eye object image Ipr when the plurality of stereoscopic object images Is are viewed to be positioned on the near side of the optimal viewing distance Vd, the optimal viewing distance Vd, and the far side of the optimal viewing distance Vd, in the HUD 2, in order from the left. Since the distance between the first virtual image V1 and the second virtual image V2 is much smaller than the optimal viewing distance Vd, the optimal viewing distance Vd can be regarded as a distance from the eye 31 of the user 30 to the virtual image plane Sv. The left-eye object image Ipl is an image of a stereoscopic object viewed from the left eye 31l. The right-eye object image Ipr is an image of a stereoscopic object viewed from the right eye 31r.

In the present embodiment, a case where the plurality of stereoscopic object images Is are positioned at the optimal viewing distance Vd, means that the plurality of stereoscopic object images Is are positioned to cross the virtual image plane Sv. When the plurality of stereoscopic object images Is are positioned at the optimal viewing distance Vd, the plurality of stereoscopic object images Is are positioned at the optimal viewing distance Vd from the eyes 31 of the user 30, at least at a part thereof. As illustrated at the center of FIG. 8, when the plurality of stereoscopic object images Is are positioned at the optimal viewing distance Vd, the left-eye object image Ipl and the right-eye object image Ipr are displayed at substantially the same position as the plurality of stereoscopic object images Is that are viewed by the user 30. At this time, the convergence angle at which the left eye 31l and the right eye 31r look at a point positioned at the optimal viewing distance Vd on the plurality of stereoscopic object images Is, is expressed as a convergence angle Δ. In a case where a 2D image is displayed on the virtual image plane Sv, the convergence angle Δ is the same angle as the convergence angle in a case where the 2D image is viewed by the user 30.

As illustrated on the right side of FIG. 8, when the plurality of stereoscopic object images Is are positioned on the far side of the optimal viewing distance Vd, the left-eye object image Ipl and the right-eye object image Ipr are displayed at different positions on the virtual image plane Sv by a parallax D. The left-eye object image Ipl is an image viewed from the left side at a smaller angle than that when the plurality of stereoscopic object images Is are viewed from the optimal viewing distance Vd. The right-eye object image Ipr is an image viewed from the right side at a smaller angle than that when the stereoscopic objects are viewed from the optimal viewing distance Vd. As a result, the user 30 perceives that the plurality of stereoscopic object images Is exist at the position of the intersection between the sight direction of viewing the left-eye object image Ipl from the left eye 31l and the sight direction of viewing the right-eye object image Ipr from the right eye 31r. At this time, the convergence angle at which the left eye 31l and the right eye 31r look at a point on the plurality of stereoscopic object images Is, is expressed as a convergence angle θ1. The convergence angle θ1 is smaller than the convergence angle Δ of viewing a point positioned at the optimal viewing distance Vd.

As illustrated on the left side of FIG. 8, when the plurality of stereoscopic object images Is are positioned on the near side of the optimal viewing distance Vd, the left-eye object image Ipl and the right-eye object image Ipr are displayed at different positions on the virtual image plane Sv by the parallax D. The left-eye object image Ipl is an image viewed from the left side at a larger angle than that when the stereoscopic objects are viewed from the optimal viewing distance Vd. The right-eye object image Ipr is an image viewed from the right side at a larger angle than that when the stereoscopic objects are viewed from the optimal viewing distance Vd. As a result, the user 30 perceives that the plurality of stereoscopic object images Is exist at the position of the intersection between the sight direction of viewing the left-eye object image Ipl from the left eye 31l and the sight direction of viewing the right-eye object image Ipr from the right eye 31r. At this time, the convergence angle at which the left eye 31l and the right eye 31r view a point on the plurality of stereoscopic object images Is, is expressed as a convergence angle θ2. The convergence angle θ2 is larger than the convergence angle Δ for viewing a point positioned at the optimal viewing distance Vd.

In this manner, by projecting the left-eye object image Ipl and the right-eye object image Ipr, which have a parallax with each other, onto the virtual image plane Sv, the user 30 can view the plurality of stereoscopic object images Is so as to exist in the three-dimensional space having a depth. As the basic structure of the disclosure, when the difference between the distance to the display surface on which the left-eye object image Ipl and the right-eye object image Ipr are actually displayed in the three-dimensional display device and the distance to the plurality of stereoscopic object images Is which are perceived by the user 30 due to the parallax given to both eyes is large, it is known that this causes discomfort and visual fatigue. It is known that the three-dimensional image can be viewed comfortably on the display device that directly displays the three-dimensional image when the difference between the convergence angle when a point on the display surface is viewed and the convergence angle when the stereoscopic shape determined by the binocular parallax is viewed (hereinafter, referred to as "parallax angle"), is suppressed within 1 degree.

Meanwhile, the inventors of the present application conducted a thorough investigation and found the following points. In other words, in a head-up display that displays the three-dimensional image by the virtual image, even when the parallax angle is set to 1 degree, the user 30 cannot view the image as a natural three-dimensional image. When continuing to view such images, there is a case where the user 30 develops an unpleasant symptom similar to motion sickness called "3D sickness". On the other hand, when the parallax angle is equal to or less than 0.43 degrees, the user 30 can view the natural three-dimensional image without feeling any discomfort.

Based on the knowledge, the HUD 2 of the disclosure is configured such that the controller 10 causes the display panel 8 to display the left-eye image and the right-eye image such that the parallax angle of the points on the plurality of stereoscopic object images Is included in the three-dimensional image is equal to or less than 0.43 degrees. In other words, the controller 10 controls the display panel 8 such that the convergence angle at which the user 30 views a point on the plurality of stereoscopic object images Is is equal to or less than the maximum convergence angle (θmax) and is equal to or greater than the minimum convergence angle (θmin), the maximum convergence angle being greater by 0.43 degrees than the convergence angle for viewing a point on the virtual image plane Sv, and the minimum convergence angle being less by 0.43 degrees than the convergence angle for viewing a point on the virtual image plane Sv. When the maximum value and the minimum value of the convergence angle for viewing a point on the virtual image plane Sv are θmax and θmin, respectively, θ max and θ min are expressed by the following expressions.

$$\theta min = \Delta - 0.43° \qquad \text{Expression (3)}$$

$$\theta max = \Delta + 0.43° \qquad \text{Expression (4)}$$

In one of the plurality of embodiments, the HUD 2 is designed to display the plurality of stereoscopic object images Is up to 70 m ahead. The distance of 70 m is a distance at which the moving object 20 travels in approximately 1 to 3 seconds at high speed (for example, from approximately 80 km/h to 250 km/h). In many cases, the user 30 who drives the moving object 20 can see up to 70 m ahead. Therefore, the plurality of stereoscopic object images Is displayed on the HUD 2 may be viewed to be positioned at a distance of up to 70 m ahead. In this case, in a case where the inter-eye distance E of the user 30 is 64 mm, the minimum value θmin of the convergence angle for viewing the plurality of stereoscopic object images Is on the far side is 0.05 degrees. Therefore, the convergence angle Δ for viewing a point on the virtual image plane Sv is 0.48 degrees. The virtual image plane Sv with a convergence angle Δ of 0.48 degrees is positioned at a distance of approximately 7.5 m ahead from the eye 31 of the user 30. Furthermore, the maximum value θmax of the convergence angle for viewing the plurality of stereoscopic object images Is on the near side is 0.91 degrees. This corresponds to a distance of approximately 4.0 m at which the plurality of stereoscopic object images Is are viewed. The HUD 2 that satisfies these requirements is designed such that Expressions (1) and (2) are satisfied with the optimal viewing distance Vd of approximately 7.5 m. Specifically, the configuration and arrangement of the display panel 8, the parallax barrier 9, and the optical system are determined to satisfy Expressions (1) and (2).

According to the above-described embodiment, in the HUD 2, it is possible to dispose the plurality of stereoscopic object images Is at optimal positions from a position of 4 m close to the user 30 in the moving object 20 to a distance of 70 m on the relatively far side. In a case where the moving object 20 is a vehicle traveling on a relatively uncrowded road, a display range of the plurality of stereoscopic object images Is with distances ranging from 4 m to 70 m is particularly appropriate. Since the convergence angle of the points on the plurality of stereoscopic object images Is included in the three-dimensional image displayed by the HUD 2 is within the range of ±0.43 degrees of the convergence angle of the points on the virtual image plane Sv, the user 30 can comfortably view the three-dimensional image displayed by the HUD 2.

In another one of the plurality of embodiments, the HUD 2 is designed to display the plurality of stereoscopic object images Is positioned at the front from a position of 2.5 m in front of the eye 31 of the user 30. The distance of 2.5 m is a distance determined by assuming the distance to the object that can exist in front of the moving object 20 when the moving object 20 stops or starts. Since the user 30 sees the surrounding objects at a distance of approximately 2.5 m in many cases when the moving object 20 stops or starts, the plurality of stereoscopic object images Is displayed on the HUD 2 may be displayed to be viewed from a distance of 2.5 m ahead. In this case, in a case where the inter-eye distance E of the user 30 is 64 mm, the maximum value θmax of the convergence angle for viewing the plurality of stereoscopic object images Is on the near side is 1.47 degrees. Therefore, the convergence angle Δ for viewing a point on the virtual image plane Sv is 1.04 degrees. The virtual image plane Sv with a convergence angle Δ of 1.04 degrees is positioned at a distance of approximately 3.5 m ahead from the eye 31 of the user 30. Furthermore, the minimum value θmin of the convergence angle for viewing the plurality of stereoscopic object images Is on the far side is 0.61 degrees. This corresponds to a distance of approximately 6 m at which the plurality of stereoscopic object images Is are viewed. The HUD 2 that satisfies these requirements is designed such that Expressions (1) and (2) are satisfied with the optimal viewing distance Vd of approximately 3.5 m. Specifically, the configuration and arrangement of the display panel 8, the parallax barrier 9, and the optical system are determined to satisfy Expressions (1) and (2).

According to the above-described embodiment, in the HUD 2, it is possible to dispose the plurality of stereoscopic object images Is at optimal positions from a position of approximately 2.5 m close to the user 30 in the moving object 20 to a distance of approximately 6 m which is positioned relatively in the vicinity. In a case where the moving object 20 is a vehicle traveling in a city or on a busy road, in many cases, the user 30 is gazing at objects in a relatively short distance, such as people, signs, and preceding vehicles in the vicinity.

Therefore, the HUD 2 can display the plurality of stereoscopic object images Is at preferable positions where the user 30 is in focus. Similar to the description above, the user 30 can comfortably view the three-dimensional image displayed by the HUD 2.

Even in a case where there is the optimal viewing distance Vd between the two optimal viewing distances Vd from the eye 31 of the user 30 to the virtual image plane Sv defined in the above-described two embodiments, the HUD 2 mounted on the moving object 20 can display the plurality of stereoscopic object images Is in any optimal distance range. In other words, the optical system of the HUD 2 is set to project the image displayed on the display panel 8 onto the virtual image plane Sv positioned at a distance of 3.5 m to 7.5 m ahead from the eye 31 of the user 30, and accordingly, the user 30 can comfortably view the plurality of stereoscopic object images Is. In this case, a shortest distance Lmin at which the plurality of stereoscopic object images Is are comfortably viewed is in the range of 2.5 m to 4 m. A longest distance Lmax at which the plurality of stereoscopic object images Is are comfortably viewed is in the range of 6 m to 70 m.

[Method of Designing Head-Up Display]

Hereinafter, an example of a method of designing the HUD 2 according to the disclosure will be described below with reference to FIG. 9.

The longest distance Lmax or the shortest distance Lmin of the plurality of stereoscopic object images Is which are viewed by the three-dimensional image is determined (step S01).

After step S01, the distance to the virtual image plane Sv is determined with the maximum parallax angle of 0.43 degrees (step S02). Specifically, in a case where the longest distance Lmax of the plurality of stereoscopic object images Is is determined in step S01, a convergence angle θmin of the point positioned at the longest distance Lmax is calculated. The optimal viewing distance Vd which is the distance to the virtual image plane Sv is determined such that the convergence angle Δ of a point on the virtual image plane Sv is greater by 0.43 degrees than the calculated convergence angle θmin. In a case where the shortest distance Lmin of the plurality of stereoscopic object images Is is determined in step S01, a convergence angle θmax of the point positioned at the shortest distance Lmin is calculated. The optimal viewing distance Vd which is the distance to the virtual image plane Sv is determined such that the convergence angle Δ of a point on the virtual image plane Sv is less by 0.43 degrees than the calculated convergence angle θmax.

After step S02, the shortest distance Lmin or the longest distance Lmax of the plurality of stereoscopic object images Is viewed by the three-dimensional image is determined (step S03). Specifically, in a case where the longest distance Lmax of the plurality of stereoscopic object images Is is determined in step S01, the shortest distance Lmin is determined such that the convergence angle θmax of the point positioned at the shortest distance Lmin at which the three-dimensional image is viewed is greater by 0.43 degrees than the convergence angle Δ of the point on the virtual image plane Sv. In a case where the shortest distance Lmin of the plurality of stereoscopic object images Is is determined in step S01, the longest distance Lmax is determined such that the convergence angle θmin of the point positioned at the longest distance Lmax at which the three-dimensional image is viewed is less by 0.43 degrees than the convergence angle Δ of the point on the virtual image plane Sv.

After step S03, the configuration and arrangement of the display panel 8, the parallax barrier 9, and the optical system are determined based on the optimal viewing distance Vd to the virtual image plane Sv determined in step S02 (step S04).

In the HUD 2 designed as described above, the controller 10 controls the display panel 8 such that the left-eye image and the right-eye image are projected as a three-dimensional image in the field of view of the user 30. The controller 10 controls the display panel 8 such that the range of distances at which the plurality of stereoscopic object images Is included in the three-dimensional image are viewed is equal to or greater than the shortest distance Lmin and equal to or less than the longest distance Lmax. In other words, the controller 10 controls the range of the parallax between the left-eye object image Ipl of the stereoscopic object included in the left-eye image displayed on the display panel 8 and the right-eye object image Ipr of the stereoscopic object included in the right-eye image, within a predetermined range.

By designing the HUD 2 as described above, the HUD 2 can allow the user 30 to comfortably view the three-dimensional image while satisfying the requirements of the longest distance Lmax or shortest distance Lmin to display the required plurality of stereoscopic object images Is. The HUD 2 can also display the three-dimensional image using the maximum distance range where the user 30 can comfortably view the three-dimensional image while satisfying the requirements of the given longest distance Lmax or the shortest distance Lmin.

The disclosure can be employed in the following embodiments.

The head-up display of the disclosure includes a display panel, an optical element, an optical system, and a processor. The display panel displays an image. The optical element defines a propagation direction of image light emitted from the display panel. The optical system is configured to propagate the image light having a propagation direction defined by the optical element, toward the eyes of the user, and project a virtual image of the image onto a virtual image plane which is positioned at a distance of 3.5 m to 7.5 m from the eyes of the user. The processor is configured to cause the display panel to display the image, the image including a first image and a second image which have a parallax with each other. The optical element is configured to propagate the first image displayed on the display panel, toward a first eye of the user, and to propagate the second image displayed on the display panel, toward a second eye of the user. The processor controls the display panel such that the first image and the second image are projected as a three-dimensional image in a field of view of the user, and a convergence angle at which the user views a point on the three-dimensional image is equal to or less than a maximum convergence angle and is equal to or greater than a minimum convergence angle, the maximum convergence angle being greater by 0.43 degrees than a convergence angle for viewing a point on the virtual image plane, and the minimum convergence angle being less by 0.43 degrees than the convergence angle for viewing a point on the virtual image plane.

A head-up display system of the disclosure includes a detection device that detects positions of eyes of a user, and a head-up display. The head-up display includes a display panel, an optical element, an optical system, and a processor. The display panel displays an image. The optical element defines a propagation direction of image light emitted from the display panel. The optical system is configured to propagate the image light having a propagation direction defined by the optical element, toward the eyes of the user, and project a virtual image of the image onto a virtual image plane which is positioned at a distance of 3.5 m to 7.5 m from the eyes of the user. The processor is configured to cause the display panel to display the image, the image including a first image and a second image which have a parallax with each other. The optical element is configured to propagate the first image displayed on the display panel, toward a first eye of the user, and to propagate the second image displayed on the display panel, toward a second eye of the user. The processor controls the display panel such that the first image and the second image are projected as a three-dimensional image in a field of view of the user, and a convergence angle at which the user views a point on the three-dimensional image is equal to or less than a maximum convergence angle and is equal to or greater than a minimum convergence angle, the maximum convergence angle being greater by 0.43 degrees than a convergence angle for viewing a point on the virtual image plane, and the minimum convergence angle being less by 0.43 degrees than the convergence angle for viewing a point on the virtual image plane. The processor is configured to be able to change a region where the first image is displayed and a region where the second image is displayed on the display panel based on the positions of the eyes of the user.

A moving object of the disclosure includes a head-up display. The head-up display includes a display panel, an optical element, an optical system, and a processor. The display panel displays an image. The optical element defines a propagation direction of image light emitted from the display panel. The optical system is configured to propagate the image light having a propagation direction defined by the optical element, toward the eyes of the user, and project a virtual image of the image onto a virtual image plane which is positioned at a distance of 3.5 m to 7.5 m from the eyes of the user. The processor is configured to cause the display panel to display the image, the image including a first image and a second image which have a parallax with each other. The optical element is configured to propagate the first image displayed on the display panel, toward a first eye of the user, and to propagate the second image displayed on the display panel, toward a second eye of the user. The processor controls the display panel such that the first image and the second image are projected as a three-dimensional image in a field of view of the user, and a convergence angle at which the user views a point on the three-dimensional image is equal to or less than a maximum convergence angle and is equal to or greater than a minimum convergence angle, the maximum convergence angle being greater by 0.43 degrees than a convergence angle for viewing a point on the virtual image plane, and the minimum convergence angle being less by 0.43 degrees than the convergence angle for viewing a point on the virtual image plane.

A method of designing a head-up display of the disclosure includes determining a longest distance at which a three-dimensional image is viewed. The method includes determining a distance of a virtual image plane such that a convergence angle of a point on the virtual image plane onto which a virtual image of an image of a display panel is projected is greater by 0.43 degrees than a convergence angle of a point positioned at the longest distance. The method includes determining a shortest distance such that a convergence angle of a point positioned at the shortest distance at which the three-dimensional image is viewed is greater by 0.43 degrees than a convergence angle of a point on the virtual image plane. The method includes, based on the distance of the virtual image plane, determining the configuration and arrangement of the display panel, the optical element that defines the propagation direction of the image light emitted from the display panel, and the optical system that propagates the image light having a propagation direction defined by the optical element, toward eyes of a user, and projects the virtual image of the image onto the virtual image plane.

A method of designing a head-up display of the disclosure includes determining a shortest distance at which a three-dimensional image is viewed. The method includes determining a distance of a virtual image plane such that a convergence angle of a point on the virtual image plane onto which a virtual image of an image of a display panel is projected is less by 0.43 degrees than a convergence angle of a point positioned at the shortest distance. The method includes determining a longest distance such that a convergence angle of a point positioned at the longest distance at which the three-dimensional image is viewed is less by 0.43 degrees than a convergence angle of a point on the virtual image plane. The method includes, based on the distance of the virtual image plane, determining the configuration and arrangement of the display panel, the optical element that defines the propagation direction of the image light emitted from the display panel, and the optical system that propagates the image light having a propagation direction defined by the optical element, toward eyes of a user, and projects the virtual image of the image onto the virtual image plane.

According to the embodiments of the disclosure, it is possible to provide a head-up display, a head-up display system, a moving object, and a method of designing a head-up display that enables a user to comfortably view a three-dimensional image.

Although the embodiments of the disclosure have been described based on various drawings and examples, it should be noted that those skilled in the art can easily make various variations or modifications based on the disclosure. Therefore, it should be noted that these variations or modifications are included in the scope of the disclosure. For example, the functions included in each component or each step can be rearranged in a logically consistent manner, and the plurality of components or steps can be combined into one or divided. Embodiments of the disclosure can also be realized as a method executed by a processor included in a device, a program, or a storage medium that records a program. It is desired to be understood that the scope of the disclosure also includes these.

In the disclosure, descriptions such as "first" and "second" are identifiers to distinguish the configurations. Configurations distinguished by "first" and "second" in the description in the disclosure can exchange numbers in the relevant configuration. For example, the first lens can exchange the identifiers "first" and "second" with the second lens. The exchange of identifiers is performed simultaneously. The configuration is still distinguished after the exchange of identifiers. The identifier may be deleted. The configuration with the identifier removed is distinguished by a sign. The fact that identifiers such as "first" and "second" in the disclosure are described should not be the base of interpretation of the order of the configurations or the presence of a small-numbered identifier.

In the disclosure, the x-axis direction, the y-axis direction, and the z-axis direction are provided for convenience of description and may be interchanged with each other. The configuration according to the disclosure has been described using a rectangular coordinate system with the x-axis direction, the y-axis direction, and the z-axis direction as the respective axes. The positional relationship of each configuration according to the disclosure is not limited to an orthogonal relationship. The same is also applied to the u-axis direction, the v-axis direction, and the w-axis direction.

For example, in the above-described embodiment, the optical element that defines the propagation direction of the image light is a parallax barrier. However, the optical elements are not limited thereto. It is also possible to use a lenticular lens as an optical element.

REFERENCE SIGNS LIST

1: Detection device
2: Head-up display (HUD)
3: Reflector (optical system)
4: Optical member (optical system)
5: Display device
6: Input unit
7: Irradiator
8: Display panel
9: Parallax barrier
10: Controller
11: Memory
20: Moving object
30: User
31: Eye
31l: Left eye (first eye)
31r: Right eye (second eye)
91: Light-transmitting region
92: Dimming region
100: Head-up display system
A: Active area
Ipl: Left-eye object image
Ipr: Right-eye object image
Is: Stereoscopic object image
Sv: Virtual image plane
V1: First virtual image
V2: Second virtual image
VaL: Left visible region
VaR: Right visible region

The invention claimed is:

1. A head-up display, comprising:
a display panel configured to display an image;
an optical element configured to define a propagation direction of image light emitted from the display panel;
an optical system configured to propagate the image light having a propagation direction defined by the optical element, toward eyes of a user, and project a virtual image of the image onto a virtual image plane which is positioned at a distance of 3.5 m to 7.5 m from the eyes of the user; and
a processor configured to cause the display panel to display the image, the image comprising a first image and a second image which have a parallax with each other,
the optical element being configured to propagate the first image displayed on the display panel, toward a first eye of the user, and to propagate the second image displayed on the display panel, toward a second eye of the user, and
the processor being configured to determine a maximum convergence angle greater by 0.43 degrees than a convergence angle for viewing a point on the virtual image plane, determine a minimum convergence angle less by 0.43 degrees than the convergence angle for viewing a point on the virtual image plane, and control the display panel such that the first image and the second image are projected as a three-dimensional image in a field of view of the user, and a convergence angle at which the user views a point on the three-dimensional image is equal to or less than the maximum convergence angle and is equal to or greater than the minimum convergence angle.

2. A head-up display system, comprising:
a detection device configured to detect positions of eyes of a user; and
a head-up display,
the head-up display comprising
  a display panel configured to display an image,
  an optical element configured to define a propagation direction of image light emitted from the display panel,
  an optical system configured to propagate the image light having a propagation direction defined by the optical element, toward the eyes of the user, and project a virtual image of the image onto a virtual image plane which is positioned at a distance of 3.5 m to 7.5 m from the eyes of the user, and
  a processor configured to cause the display panel to display the image, the image comprising a first image and a second image which have a parallax with each other,
the optical element being configured to propagate the first image displayed on the display panel, toward a first eye of the user, and to propagate the second image displayed on the display panel, toward a second eye of the user,
the processor being configured to determine a maximum convergence angle greater by 0.43 degrees than a convergence angle for viewing a point on the virtual image plane, determine a minimum convergence angle less by 0.43 degrees than the convergence angle for viewing a point on the virtual image plane, and control the display panel such that the first image and the second image are projected as a three-dimensional image in a field of view of the user, and a convergence angle at which the user views a point on the three-dimensional image is equal to or less than the maximum convergence angle and is equal to or greater than the minimum convergence angle,
the processor being configured to be able to change a region where the first image is displayed and a region where the second image is displayed on the display panel based on the positions of the eyes of the user.

3. A moving object, comprising:
a head-up display comprising a display panel configured to display an image, an optical element configured to define a propagation direction of image light emitted from the display panel, an optical system configured to propagate the image light having a propagation direction defined by the optical element, toward eyes of a user, and project a virtual image of the image onto a virtual image plane which is positioned at a distance of 3.5 m to 7.5 m from the eyes of the user, and a processor configured to cause the display panel to display the image, the image comprising a first image and a second image which have a parallax with each other, in which the optical element is configured to propagate the first image displayed on the display panel, toward a first eye of the user, and to propagate the second image displayed on the display panel, toward a second eye of the user, and the processor is configured to determine a maximum convergence angle greater by 0.43 degrees than a convergence angle for viewing a point on the virtual image plane, determine a minimum convergence angle less by 0.43 degrees than the convergence angle for viewing a point on the virtual image plane, and control the display panel such that the first image and the second image are projected as a three-dimensional image in a field of view of the user, and a convergence angle at which the user views a point on the three-dimensional image is equal to or less than the maximum convergence angle and is equal to or greater than the minimum convergence angle.

4. A method of designing a head-up display, comprising:
determining a longest distance at which a three-dimensional image is viewed;
determining a distance of a virtual image plane such that a convergence angle of a point on the virtual image plane onto which a virtual image of an image of a display panel is projected is greater by 0.43 degrees than a convergence angle of a point positioned at the longest distance;
determining a shortest distance such that a convergence angle of a point positioned at the shortest distance at which the three-dimensional image is viewed is greater by 0.43 degrees than a convergence angle of a point on the virtual image plane; and
based on the distance of the virtual image plane, determining a configuration and arrangement of the display panel, an optical element that defines a propagation direction of image light emitted from the display panel, and an optical system that propagates the image light having a propagation direction defined by the optical element, toward eyes of a user, and projects the virtual image of the image onto the virtual image plane.

5. The method of designing a head-up display according to claim 4, further comprising:
providing a processor configured to cause the display panel to display the image comprising a first image and a second image which have a parallax with each other, wherein the processor is configured to control the display panel such that the first image and the second image are projected as a three-dimensional image in a field of view of a user, and a range of a distance where the three-dimensional image is viewed is equal to or greater than the shortest distance and is equal to or less than the longest distance.

6. A method of designing a head-up display, comprising:
determining a shortest distance at which a three-dimensional image is viewed;
determining a distance of a virtual image plane such that a convergence angle of a point on the virtual image plane onto which a virtual image of an image of a display panel is projected is less by 0.43 degrees than a convergence angle of a point positioned at the shortest distance;
determining a longest distance such that a convergence angle of a point positioned at the longest distance at which the three-dimensional image is viewed is less by 0.43 degrees than a convergence angle of a point on the virtual image plane; and
based on the distance of the virtual image plane, determining a configuration and arrangement of the display panel, an optical element that defines a propagation direction of image light emitted from the display panel, and an optical system that propagates the image light having a propagation direction defined by the optical element, toward eyes of a user, and projects the virtual image of the image onto the virtual image plane.

7. The method of designing a head-up display according to claim 6, further comprising:

provide a processor configured to cause the display panel to display the image comprising a first image and a second image which have a parallax with each other, wherein the processor is configured to control the display panel such that the first image and the second image are projected as a three-dimensional image in a field of view of a user, and a range of a distance where the three-dimensional image is viewed is equal to or greater than the shortest distance and is equal to or less than the longest distance.

\* \* \* \* \*